United States Patent [19]

Jungowski et al.

[11] Patent Number: 4,867,190

[45] Date of Patent: Sep. 19, 1989

[54] DAMPING PRESSURE PULSATIONS IN PIPING SYSTEMS

[75] Inventors: Wiktor M. Jungowski; Wojciech Studzinski, both of Calgary, Canada

[73] Assignee: Nova-Husky Research Corporation Ltd., Calgary, Canada

[21] Appl. No.: 262,098

[22] Filed: Oct. 19, 1988

Related U.S. Application Data

[63] Continuation of Ser. No. 911,215, Sep. 24, 1986, abandoned.

[51] Int. Cl.4 .............................................. F16L 55/00
[52] U.S. Cl. .................................... 137/1; 137/561 R

[58] Field of Search ........................... 137/1, 561, 861; 138/37

[56] References Cited

U.S. PATENT DOCUMENTS 4,305,429 12/1981 Parras ..................................... 138/37

Primary Examiner—Alan Cohan
Attorney, Agent, or Firm—Bernard, Rothwell & Brown

[57] ABSTRACT

Flow-induced pressure pulsations in a piping system transporting natural gas or other gaseous medium are suppressed by disturbing the shear layer in the open end of a sidebranch line. Inserts are located in the sidebranch line to effect the shear layer disturbance.

14 Claims, 11 Drawing Sheets

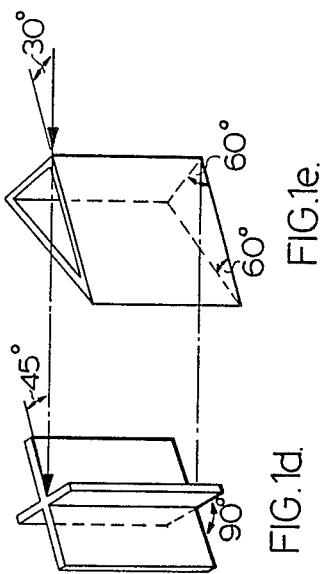
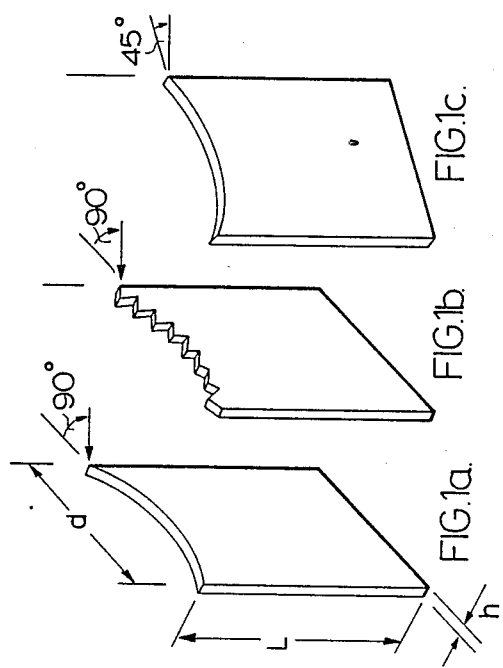

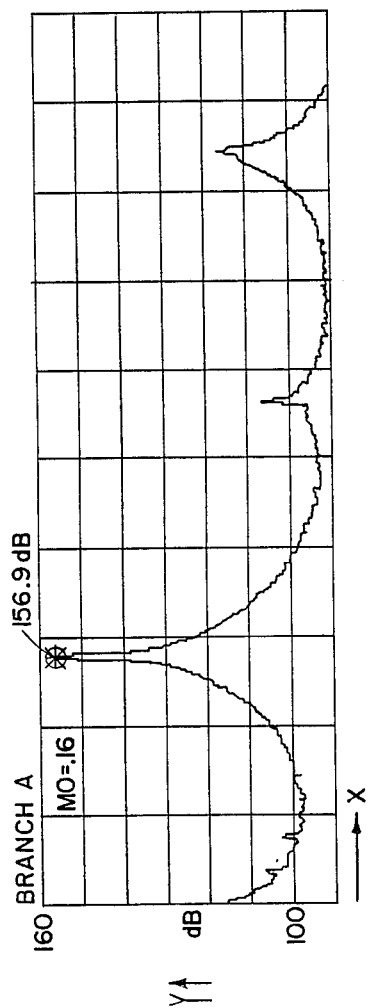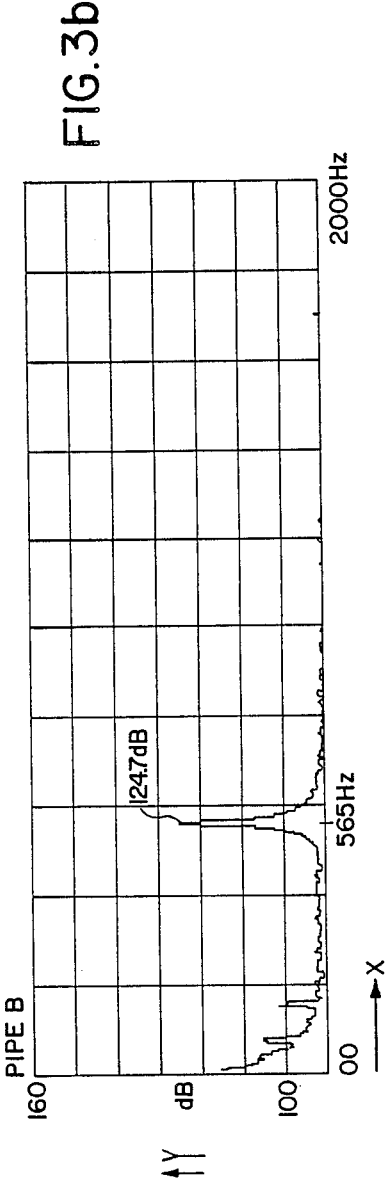

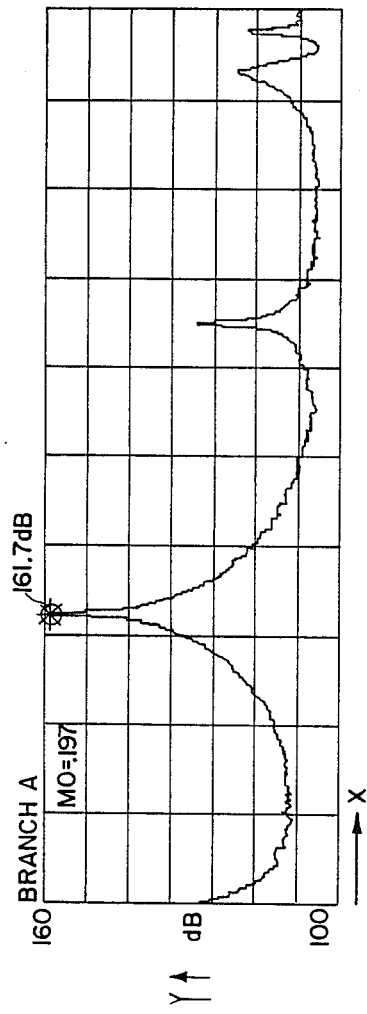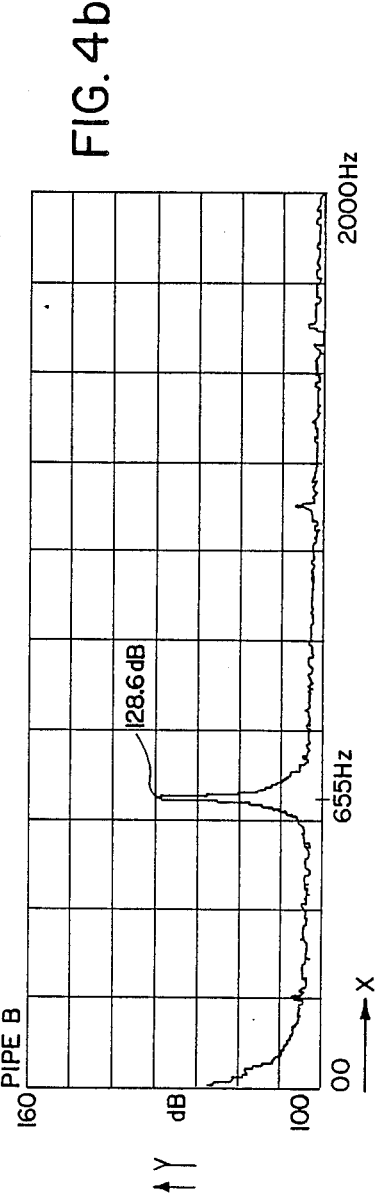

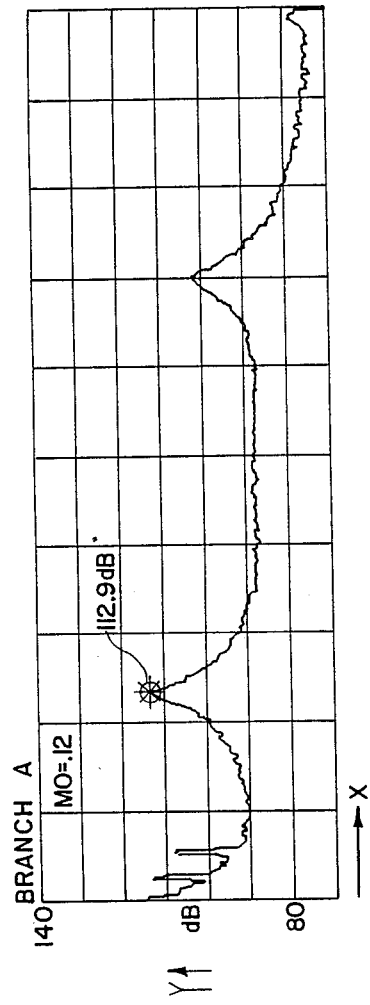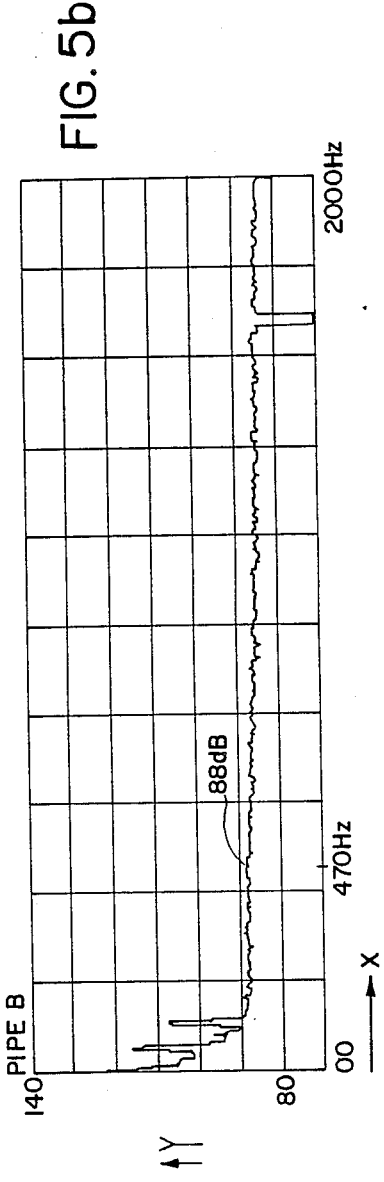

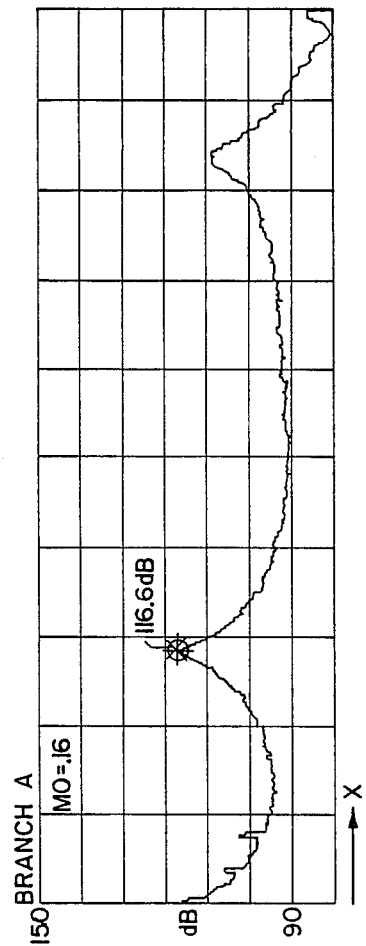
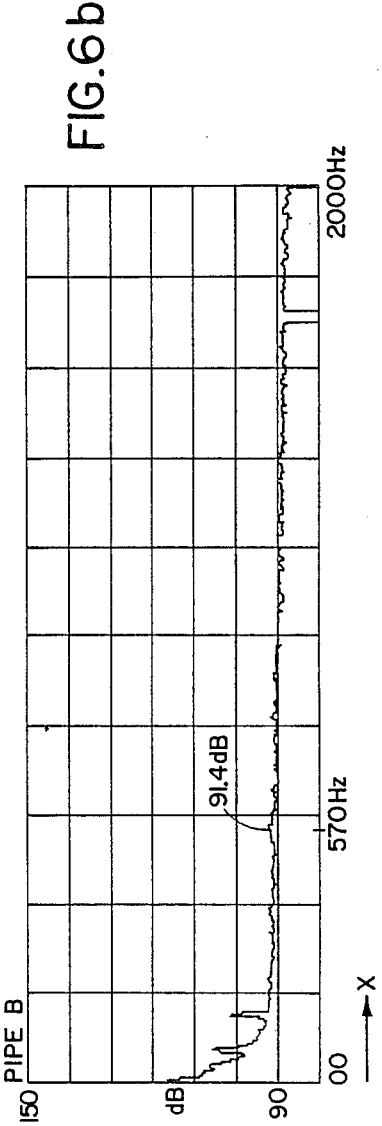
FIG.6a
FIG.6b

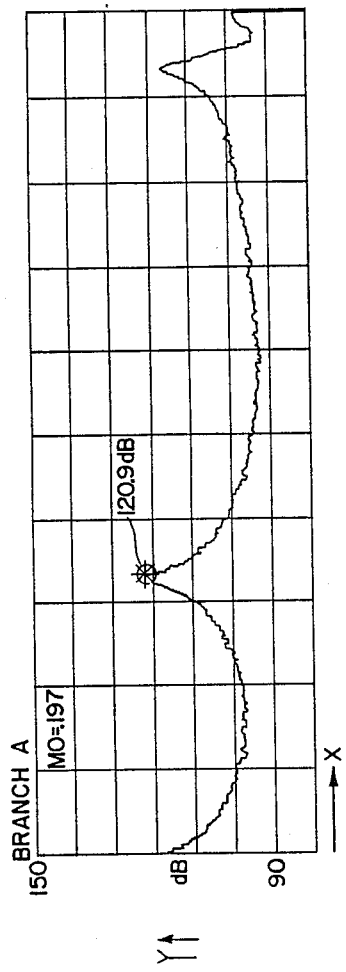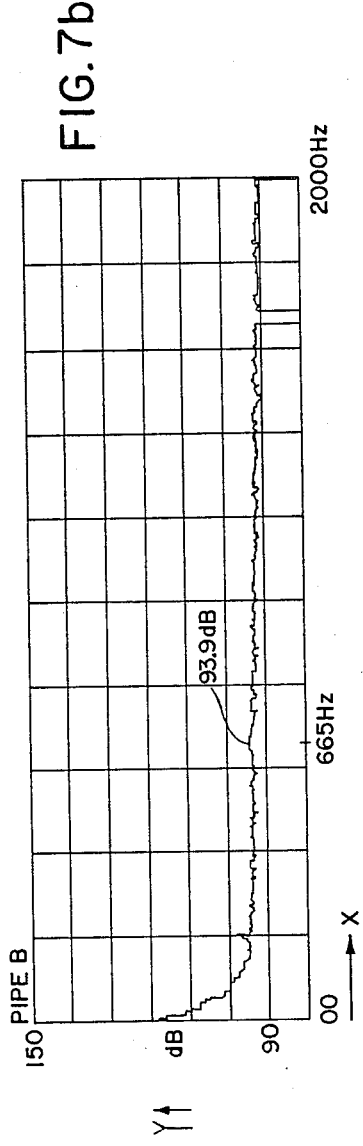

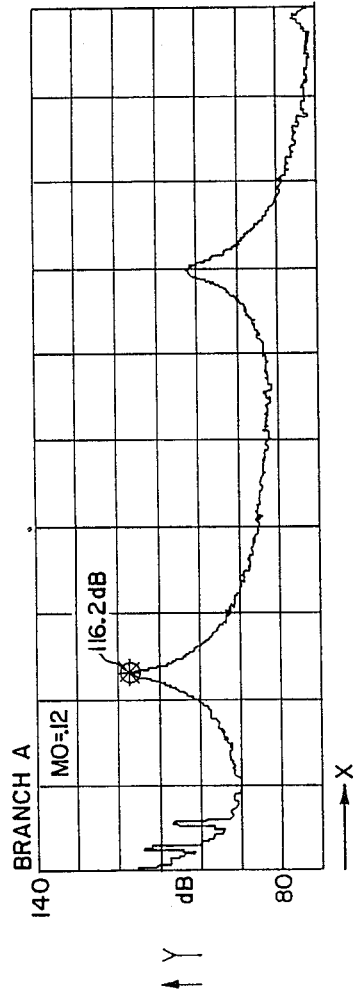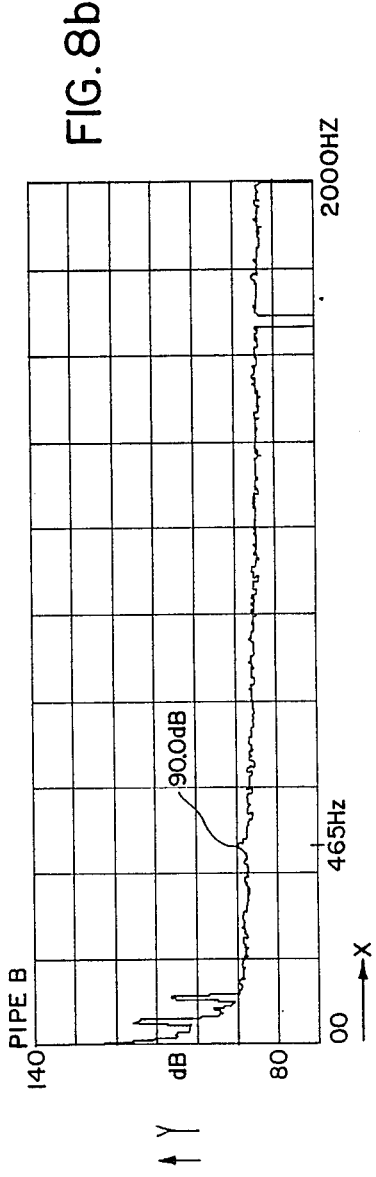

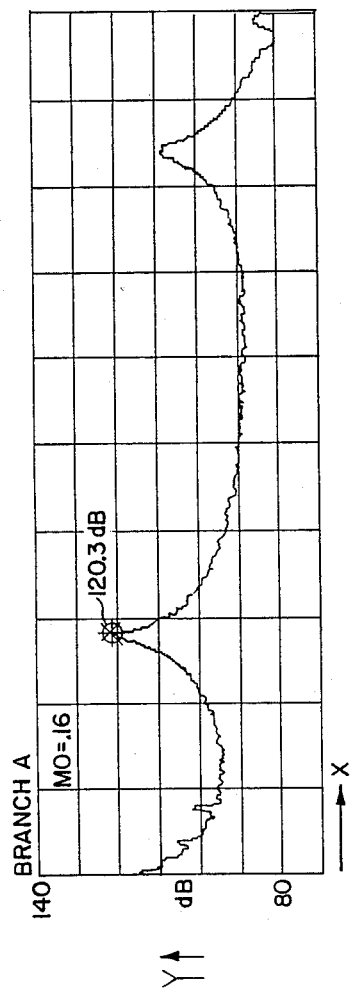
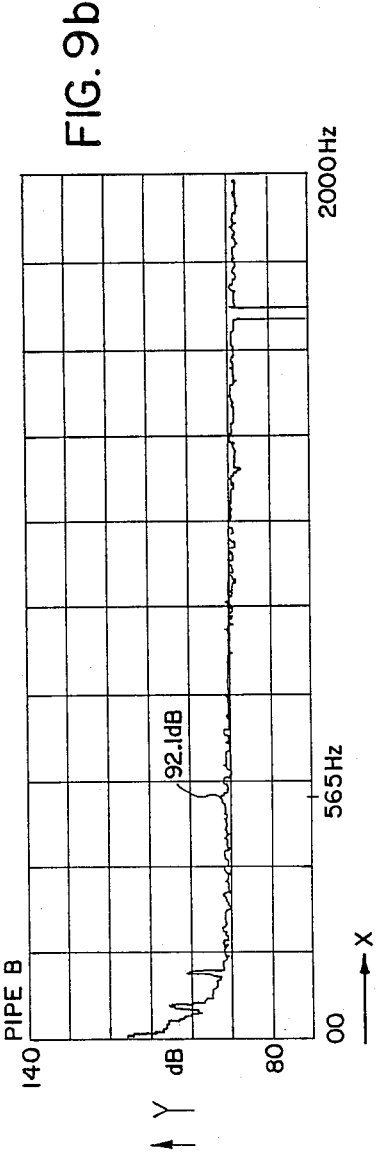

DAMPING PRESSURE PULSATIONS IN PIPING SYSTEMS

This is a continuation of application Ser. No. 911,215, filed Sept. 24, 1986 now abandoned.

FIELD OF INVENTION

The present invention relates to the damping of pressure pulsations in piping systems.

BACKGROUND TO THE INVENTION

Flow-induced pressure pulsations are common phenomena in natural gas pipelines, steam power plants and similar piping systems and occur at discontinuities in the pipeline, generally at a T-junction with a pressure relief line or other closed sidebranch. Such pressure pulsations are undesirable since they may cause pipe vibrations leading to material fatigue and gas explosions, generate excessive noise and disturb flow rate measurements.

It is known that these pulsations are generated by vortex shedding at the branch pipe. The vortex shedding frequency, or Strouhal number, is determined by the relationship:

$$S = \frac{f_s d}{v}$$

wherein S is the Strouhal number, $f_s$ is the Strouhal centre frequency, d is the diameter of the sidebranch pipe and v is the velocity in the main line. Coincidence between the Strouhal number and the resonant acoustical frequency of the closed sidebranch pipe causes the pressure pulsation to occur.

In instances where such pressure pulsations have occurred, it has been suggested to alter the length of the sidebranch pipe to change its resonant frequency outside the Strouhal eddy shedding frequency range. However, this solution is not universally applicable, and is not practical for a piping system which is to carry gas over a wide range of flow rates.

SUMMARY OF INVENTION

In accordance with the present invention, the prior art vibration and pressure pulsation problem has been overcome by disturbing the shear layer in the open end of the sidebranch line by the use of inserts in the sidebranch line adjacent the open end thereof.

By disturbing the shear layer in accordance with the present invention, normal eddy shedding is suppressed and the excitation of resonance in the branch is eliminated over a whole range of flow rates through the pipeline.

BRIEF DESCRIPTION OF DRAWINGS

FIGS. 1a to 1e illustrates five different forms of insert which have been used in the present invention to suppress pressure pulsations;

FIGS. 2 to 10 are acoustical spectra generated using selected ones of the inserts illustrated in FIG. 1.

GENERAL DESCRIPTION OF INVENTION

Essential to the invention is disturbance of the shear layer in the open end of the closed sidebranch pipe. This disturbance is achieved by placing inserts in the open end of the sidebranch pipe at the tee-junction. Such inserts may take a variety of shapes and preferably are located such as not to protrude into the main pipeline where they may interfere with pipe-line cleaning pigs.

One form of insert is a flat plate located bisecting the cross-section of the side branch pipe and transverse to the flow of the gas stream in the main pipeline. This form of insert also may be oriented at angles other than 90° to the gas stream flow, and in one particular embodiment, may be oriented approximately 45° to the gas stream flow. The leading edge of the insert, i.e. the edge located in the open end of the sidebranch pipe and facing into the main pipe insert generally is contoured to the diameter of the main pipe and may be serrated, if desired.

In one preferred embodiment, a pair of such plates is employed arranged at approximately right angles to each other and each having a smoothly-contoured leading edge. The resulting insert is located in the sidebranch pipe at about 45° to the direction of gas stream flow in the main pipe and flush with the join between the sidebranch line and the main pipeline.

Figure 1F:
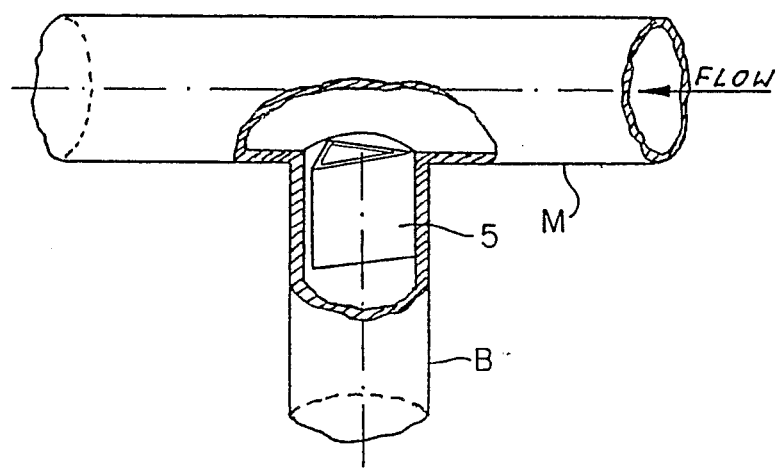
FIG. 1f shows one insert located in a sidebranch line of a main gas line.

The most effective form of insert which has been tested is a plate bent along parallel fold lines to form a regular prism having a cross-section in the form of an equilateral triangle as shown in FIGS. 1e and 1f. One 60° corner of the insert 60° corner 5 may be located upstream with the opposite downstream wall then positioned approximately perpendicular to the flow direction as shown in FIG. 1f where M is the main pipeline and B is the sidebranch pipe.

It will be observed that all of these inserts effectively divide the end portion of the sidebranch pipe into separate passageways, either two passageways as with the inserts of FIGS. 1a, 1b, and 1c, or four passageways as with the inserts of FIGS. 1d and 1e, each passageway communicating both with the open end of the sidebranch line and with a portion of the sidebranch line adjacent that end portion. It will also be clear that these inserts, the plate-like parts of which lie parallel to any flow in the sidebranch line, do not provide any substantial resistance to flow in the sidebranch line.

EXAMPLES

Examples 1 to 5

These Examples illustrate use of a variety of different inserts of the form illustrated in FIGS. 1a to 1e.

A laboratory pipeline of diameter D=4 inch was provided with a branch pipe of diameter d=1 inch (d/D=0.25) and of inside curvature r/d=0.1. Five different inserts were tested. The inserts were made of brass sheet (h=0.8 mm, 1=d) and were mounted with their leading edges flush with the inside surface of the main pipe. The shapes of inserts tested are shown in FIGS. 1a to 1e and are labelled 1 to 5 respectively. The flow direction was perpendicular to the insert (90°) or oblique (45° or 30°), as indicated in FIGS. 1a to 1e and, in a typical insert arrangement using insert 5, as shown in FIG. 1f.

Acoustical spectra were taken at the closed end of the branch (A) and in the main pipe downstream of the branch (B) both for a tuned branch without insert and for the branch with the inserts. To anechoic terminations were provided as boundary conditions of the test section.

The acoustical spectra so generated are reproduced as FIGS. 2 to 10. FIGS. 2 to 4 refer to the tuned branch without any inserts, FIGS. 5 to 7 result from measurements done with insert 1 and FIGS. 8 to 10 with insert 4.

Figure 2A:
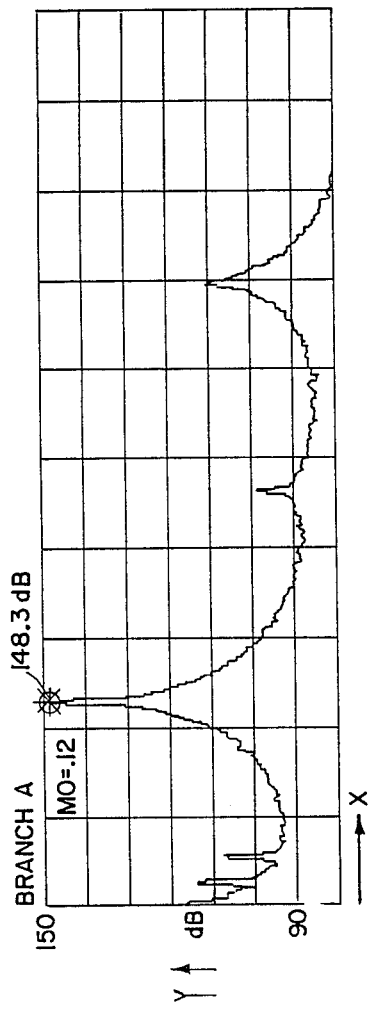
Figure 2B:
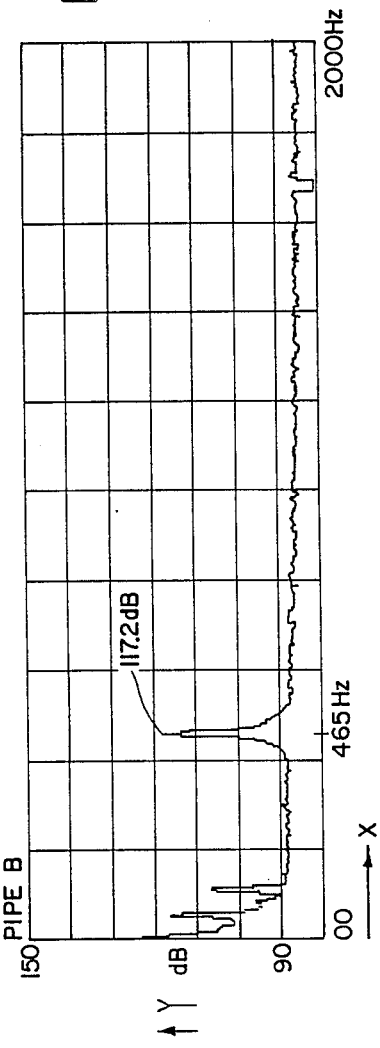

In each case, the suffix (a) or (b) of the figure number refers respectively to the spectra at the closed branch end (A) and in the main pipe downstream of the branch (B). In FIGS. 2 to 4 the spectra were acquired for three flow Mach numbers (MO) as shown at the tops of FIGS. 2a, 3a and 4a, namely 0.12 (FIG. 2), 0.16 (FIG. 3) and 0.197 (FIG. 4). The horizontal coordinate (X) shows frequency in Hz (Hertz) and the vertical one (Y) pulsation leval (root mean square - RMS) in dB (decibel) referred to 20 uPa (micro Pascal). The graphs also show peak frequency (465 Hz in FIG. 2) and corresponding peak levels (Y(A)=148.3 dB in FIG. 2a and Y(B)=117.2 dB in FIG. 2b). The various flow Mach numbers and symbols for FIGS. 5 to 10 are the same as in FIGS. 2 to 4 and are also indicated on the tops of the respective graphs.

Figure 10A:
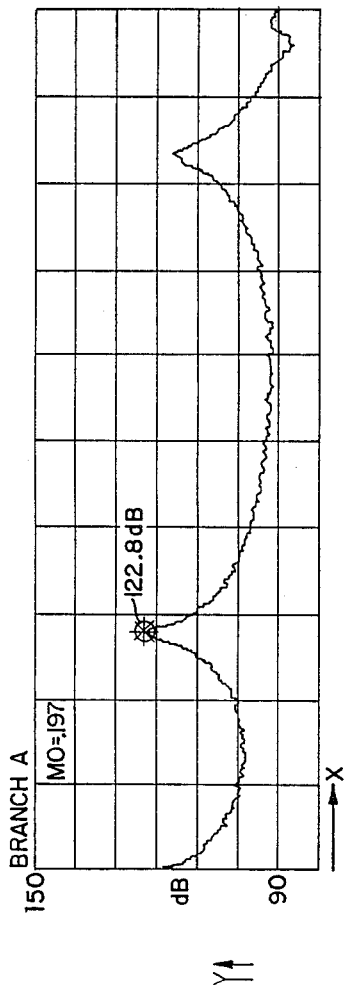
Figure 10B:
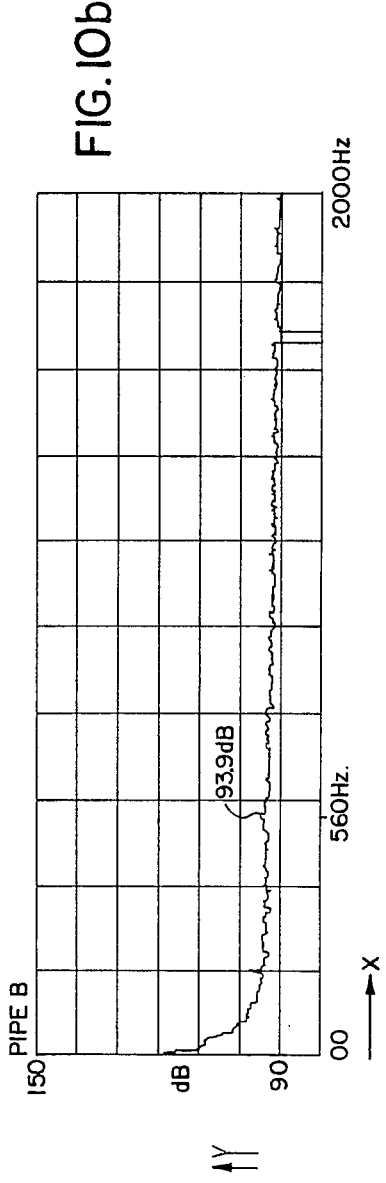

As the spectra in FIGS. 2 to 4 indicate, the dominant discrete top was growing with increase in the flow Mach number, reaching 161.7 dB in the branch and 128.6 dB in the main pipe. Insert 1 suppressed this tone to 120.9 dB (M=0.197) or about 100 times, in the branch, and in the main pipe to the 93.9 dB level of background noise (FIG. 7). Insert 4 also suppressed the peaks but to 122.8 dB in the branch and to the background noise level in the main pipe (FIG. 10).

The data acquired with the empty branch and the five inserts was collated and appears in Table I below:

TABLE I

| Insert | | None | 1 | | 2 | | 3 | | 4 | | 5 | |
| --- | --- | --- | --- | --- | --- | --- | --- | --- | --- | --- | --- | --- |
| Peak | M | B | B | N | B | N | B | N | B | N | B | N |
| BL[m] | 0.12 | 0.172 | 0.172 | 0.073 | 0.172 | — | 0.172 | 0.085 | 0.172 | 0.187 | 0.364 | — |
| f[Hz] | | 465 | 470 | 975 | 470 | — | 460 | 865 | 460 | 420 | 225 | — |
| RMS[dB] | | 148.3 | 112.9 | 121.8 | 114 | — | 116.7 | 118.2 | 116.2 | 116.7 | 113.4 | — |
| BL[m] | 0.16 | 0.140 | 0.140 | — | 0.140 | — | 0.140 | — | 0.140 | — | 0.254 | 0.120 |
| f[Hz] | | 565 | 570 | — | 565 | — | 560 | — | 565 | — | 325 | 670 |
| RMS[dB] | | 156.9 | 116.6 | — | 118.9 | — | 121.6 | — | 120.3 | — | 117.4 | 117.2 |
| BL[m] | 0.20 | 0.119 | 0.119 | 0.044 | 0.119 | 0.047 | 0.119 | 0.104 | 0.119 | 0.046 | 0.161 | 0.097 |
| f[Hz] | | 650 | 665 | 1465 | 655 | 1450 | 655 | 730 | 560 | 1320 | 500 | 880 |
| RMS[dB] | | 161.1 | 120.9 | 149.4 | 123.2 | 125.3 | 124.5 | 127.3 | 122.8 | 126.5 | 118.8 | 121.4 |

In Table I, (B) denotes a basic peak occurring with the same branch length as it was without inserts. (N) denotes a new maximum peak obtained with a varied branch length. The branch length corresponding to the main peak was different with the insert than without it.

As may be seen from the data presented in Table I, the lowest B but highest N peaks were obtained with insert 1. Inserts 2, 4 and 5 gave only small differences between the peaks B and N. Insert 3 was less efficient than the others. All the inserts significantly suppressed the tone peak.

SUMMARY OF DISCLOSURE

In summary of this disclosure, the present invention enables pressure pulsations to be suppressed by disturbing the shear layer in the branch cavity. Modifications are possible within the scope of this invention.

What we claim is:

1. A method for the inhibition of flow induced pressure pulsations in a pipe transporting a gas at a junction with a sidebranch line having a normally closed end remote from said junction and an open end at said junction, wherein flow of said gas through said pipe produces a shear layer in the cavity of the sidebranch line, which comprises disturbing the shear layer at the open end of the sidebranch line by means of an insert located in an end portion of the sidebranch line adjacent said junction, said insert having an edge facing into said pipe which edge is contoured to be flush with pipe surfaces immediately upstream and downstream of said junction, the insert extending across said portion of the sidebranch line effectively to divide said end portion into separate passageways, each passageway communicating both with said open end and with a portion of the sidebranch line adjacent said end portion.

2. The method of claim 1 wherein said insert takes the form of a flat plate which bisects the cross-section of the pipe and is oriented from about 45° to about 90° to the direction of flow of the gas stream in the pipe.

3. The method of claim 2, wherein the leading edge is smoothly contoured.

4. The method of claim 2 wherein the leading edge is serrated.

5. The method of claim 1, wherein the insert comprises several flat plates which divide the said end portion of the sidebranch line into four passageways.

6. The method of claim 1 wherein said insert takes the form of a pair of flat plates oriented at approximately 90° to each other and is oriented so that one of the pairs of plates is approximately 45° to the direction of flow of the gas stream in the pipe.

7. A method for the inhibition of flow induced pressure pulsations in a pipe transporting a gas at a junction with a sidebranch line having a normally closed end remote from said junction and an open end at said junction, wherein flow of said gas through said pipe produces a shear layer in the cavity of the sidebranch line, which comprises disturbing the shear layer at the open end of the sidebranch line by means of an insert located in an end portion of the sidebranch line adjacent said junction, said insert having an edge facing into said pipe which edge is contoured to be flush with pipe surfaces immediately upstream and downstream of said junction, and wherein said insert takes the form of a plate bent along parallel fold lines into a prismatic shape with cross-section in the form of an equilateral triangle, one 60° corner of said insert being located upstream of the gas stream flow with the opposite downstream plate wall approximately perpendicular to the flow direction.

8. In a piping system for the transportation of a gas wherein a sidebranch line meets a pipe at a junction, the sidebranch line having a normally closed end remote from the junction and having an open end at said junction, the improvement which comprises an insert located in an end portion of the sidebranch line adjacent said junction, said insert having an edge facing into said pipe which edge is contoured to be flush with pipe surfaces immediately upstream and downstream of said junction, the insert extending across said end portion of the sidebranch line effectively to divide said end portion into separate passageways, each passageway communicating both with said open end and with a portion of the sidebranch line adjacent said end portion.

9. The piping system of claim 8 wherein said insert takes the form of a flat plate which bisects the cross-section of the pipe and is oriented from about 45° to about 90° to the direction of flow of the gas stream in the pipe.

10. The piping system of claim 9, wherein the leading edge is smoothly contoured.

11. The piping system of claim 9 wherein the leading edge is serrated.

12. The system according to claim 8, wherein the insert comprises several flat plates which divide the said end portion into four passageways.

13. The piping system of claim 8 wherein said insert takes the form of a pair of flat plates oriented at approximately 90° to each other and is oriented so that one of the pairs of plates is approximately 45° to the direction of flow of the gas stream in the pipe.

14. In a piping system for the transportation of a gas wherein a sidebranch line meets a pipe at a junction, the sidebranch line having a normally closed end remote from the junction and having an open end at said junction, the improvement which comprises an insert located in an end portion of the sidebranch line adjacent said junction, said insert having an edge facing into said pipe which edge is contoured to be flush with pipe surfaces immediately upstream and downstream of said junction, and wherein said insert takes the form of a plate bent along parallel fold lines into a prismatic shape with cross-section in the form of an equilateral triangle, one 60° corner of said insert being located upstream of the gas stream flow with the opposite downstream plate wall approximately perpendicular to the flow direction.

* * * * *

UNITED STATES PATENT AND TRADEMARK OFFICE
CERTIFICATE OF CORRECTION

PATENT NO. : 4,867,190

DATED : September 19, 1989

INVENTOR(S) : WIKTOR M. JUNGOWSKI ET AL.

It is certified that error appears in the above-identified patent and that said Letters Patent is hereby corrected as shown below:

Col. 1, line 60, after ";" insert --and--.
Col. 2, line 12, delete "insert";
Col. 2, line 27, delete "60° corner" (second occurrence).
Col. 3, line 21, "top" should be --tone--.

Signed and Sealed this

Twenty-third Day of October, 1990

Attest:

HARRY F. MANBECK, JR.

*Attesting Officer*　　　　*Commissioner of Patents and Trademarks*